(12) United States Patent
Belinchón Vergara et al.

(10) Patent No.: US 8,554,882 B2
(45) Date of Patent: Oct. 8, 2013

(54) METHOD, APPARATUSES AND COMPUTER PROGRAM FOR PARENTAL CONTROL OVER CHILDREN'S ACTIVITIES IN AN IMS NETWORK

(75) Inventors: Maria-Carmen Belinchón Vergara, Getafe (ES); Berta Isabel Escribano Bullon, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 344 days.

(21) Appl. No.: 13/003,993

(22) PCT Filed: Jul. 15, 2008

(86) PCT No.: PCT/EP2008/059223
§ 371 (c)(1),
(2), (4) Date: Jan. 13, 2011

(87) PCT Pub. No.: WO2010/006643
PCT Pub. Date: Jan. 21, 2010

(65) Prior Publication Data
US 2011/0119359 A1    May 19, 2011

(51) Int. Cl.
*G06F 15/177* (2006.01)
*G06F 15/173* (2006.01)
*G06F 15/16* (2006.01)
*H04L 12/28* (2006.01)

(52) U.S. Cl.
USPC ........... 709/220; 709/208; 709/223; 709/227; 709/228; 709/230; 370/254; 370/338; 370/352; 370/356

(58) Field of Classification Search
USPC ................. 709/220, 208, 223, 227, 228, 230; 370/254, 338, 352, 356
See application file for complete search history.

(56) References Cited

U.S. PATENT DOCUMENTS

| | | |
|---|---|---|
| 2011/0119359 A1 | 5/2011 | Belinchon Vergara et al. |
| 2011/0194459 A1 | 8/2011 | Vergara et al. |

*Primary Examiner* — David Lazaro
*Assistant Examiner* — Farzana Huq

(57) ABSTRACT

The present invention faces the issue of exercising a parental control over children's activities in the IMS network, in terms of registering into the IMS network as well as in terms of call establishment, and provides for a new IMS subscription model supporting a hierarchy of IMPI's, so-called 'primary' IMPI's and so-called 'secondary' IMPI's, whereby only the primary IMPI's are allowed to register themselves, whereas the secondary IMPI's can only register themselves after having been previously registered by a primary IMPI. To this end, the present invention provides for a new method and an enhanced HSS to allow the implicit registration of one or more 'secondary' IMPI's upon the explicit registration of an IMS subscriber with a given IMPI/IMPU pair, wherein the given IMPI is a 'primary' IMPI and the given IMPU is associated with a registration set of IMPI's which includes said one or more 'secondary' IMPI's.

24 Claims, 11 Drawing Sheets

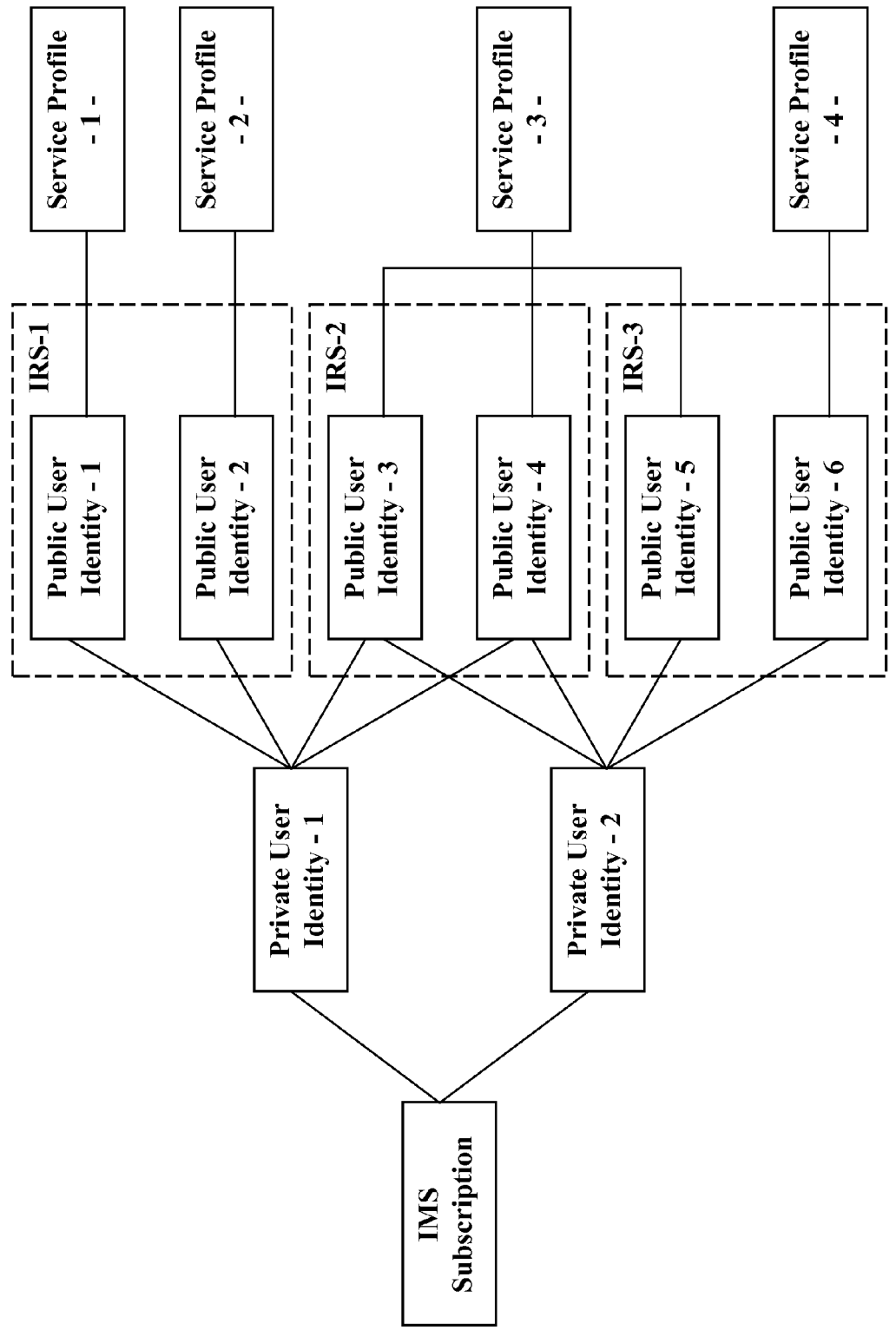
FIG. -1- Related Art

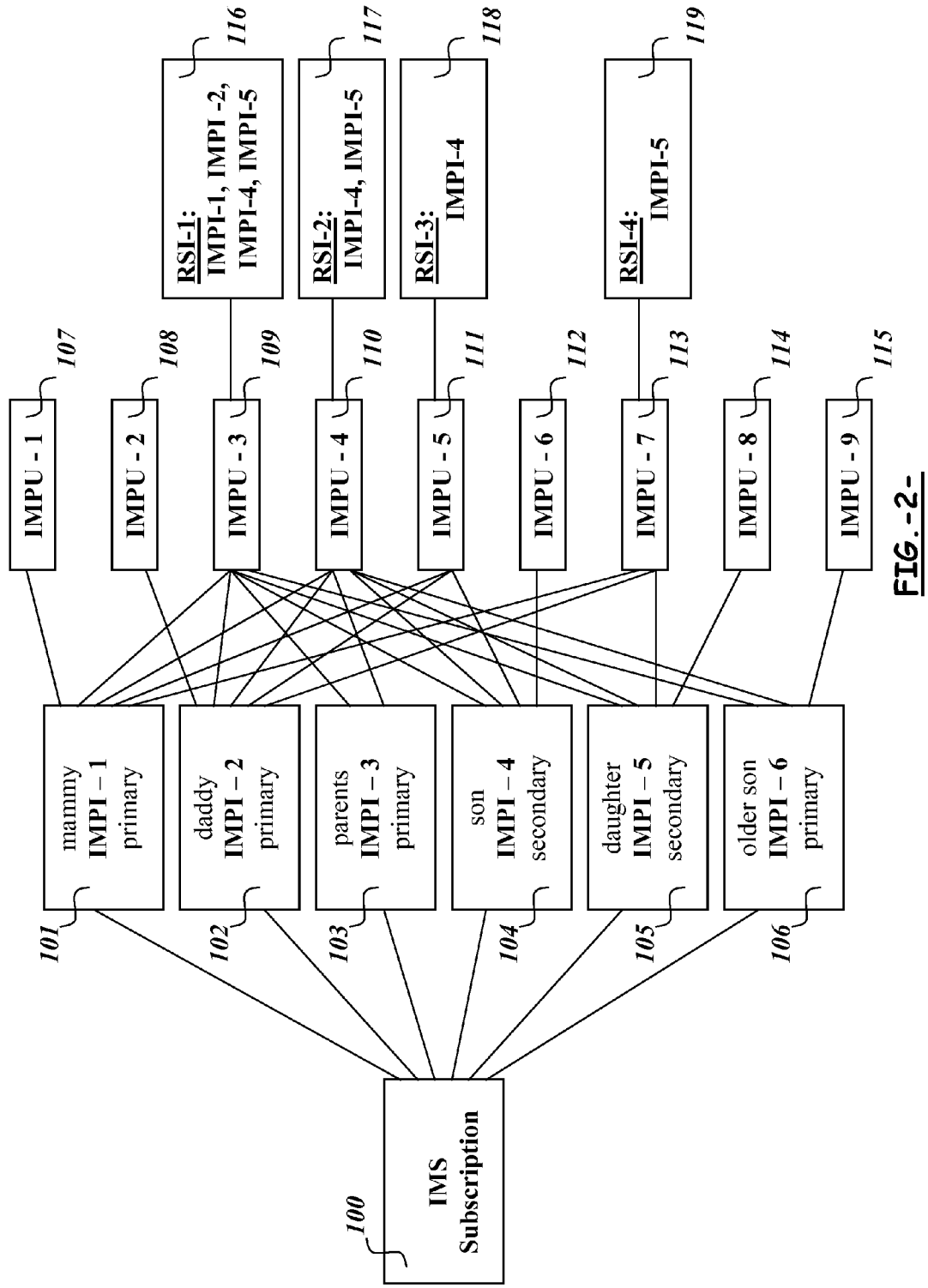
FIG. -2-

IMPI – 1
- IMPU: IMPU-1, IMPU-3, IMPU-4, IMPU-5, IMPU-7;
- Primary
- Contact add.: IP.ad-3, IP.ad-4, IP.ad-5, IP.ad-7
- Registration Barring: none

*121*

IMPI – 2
- IMPU: IMPU-2, IMPU-3, IMPU-4, IMPU-5, IMPU-7;
- Primary
- Contact add.: IP.ad-3, IP.ad-4, IP.ad-5, IP.ad-7
- Registration Barring: none

*122*

IMPI – 3
- IMPU: IMPU-3, IMPU-4;
- Primary
- Contact add.: IP.ad-3, IP.ad-4, IP.ad-5, IP.ad-7
- Registration Barring: none

*123*

IMPI – 4
- IMPU: IMPU-3, IMPU-4, IMPU-5, IMPU-6;
- Secondary
- Contact add.: IP.ad-3, IP.ad-4, IP.ad-5, IP.ad-6
- Registration Barring: RSI, OWN

*124*

IMPI – 5
- IMPU: IMPU-3, IMPU-4, IMPU-7, IMPU-8;
- Secondary
- Contact add.: IP.ad-3, IP.ad-4, IP.ad-7, IP.ad-8
- Registration Barring: RSI, OWN

*125*

IMPI – 6
- IMPU: IMPU-3, IMPU-4, IMPU-9;
- Primary
- Contact add.: IP.ad-3, IP.ad-4, IP.ad-9
- Registration Barring: RSI

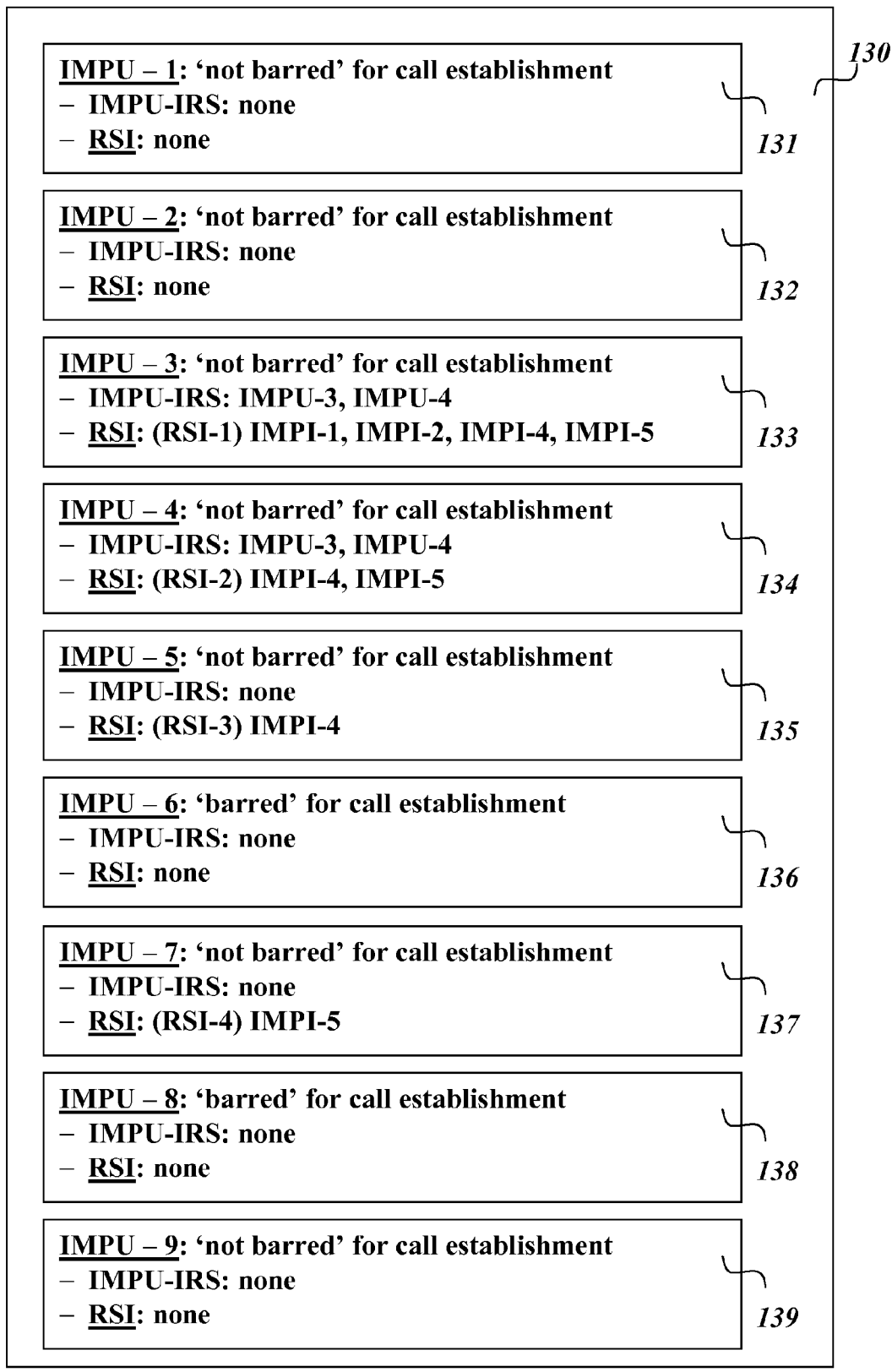
FIG.-4-

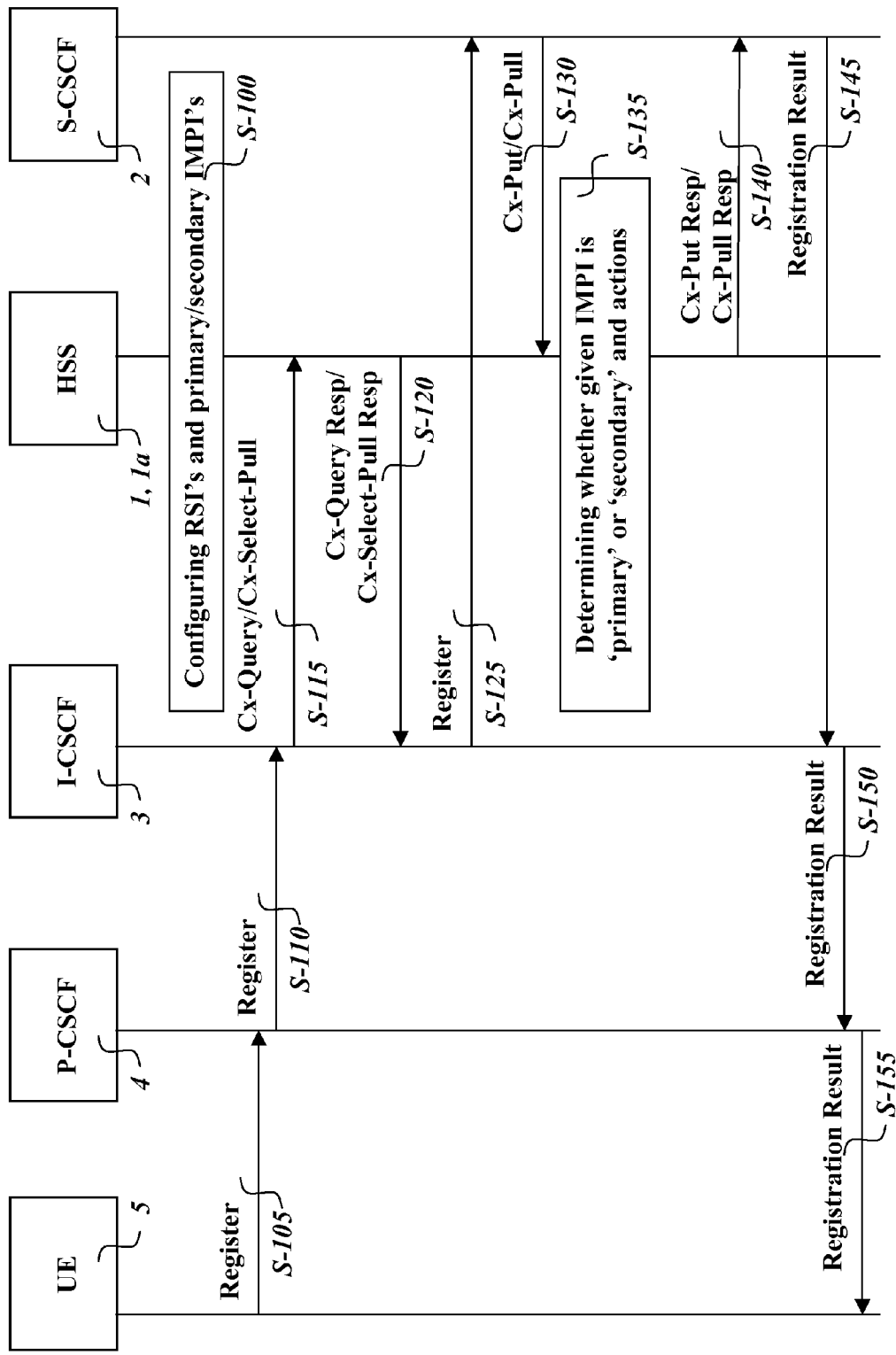
FIG.-5-

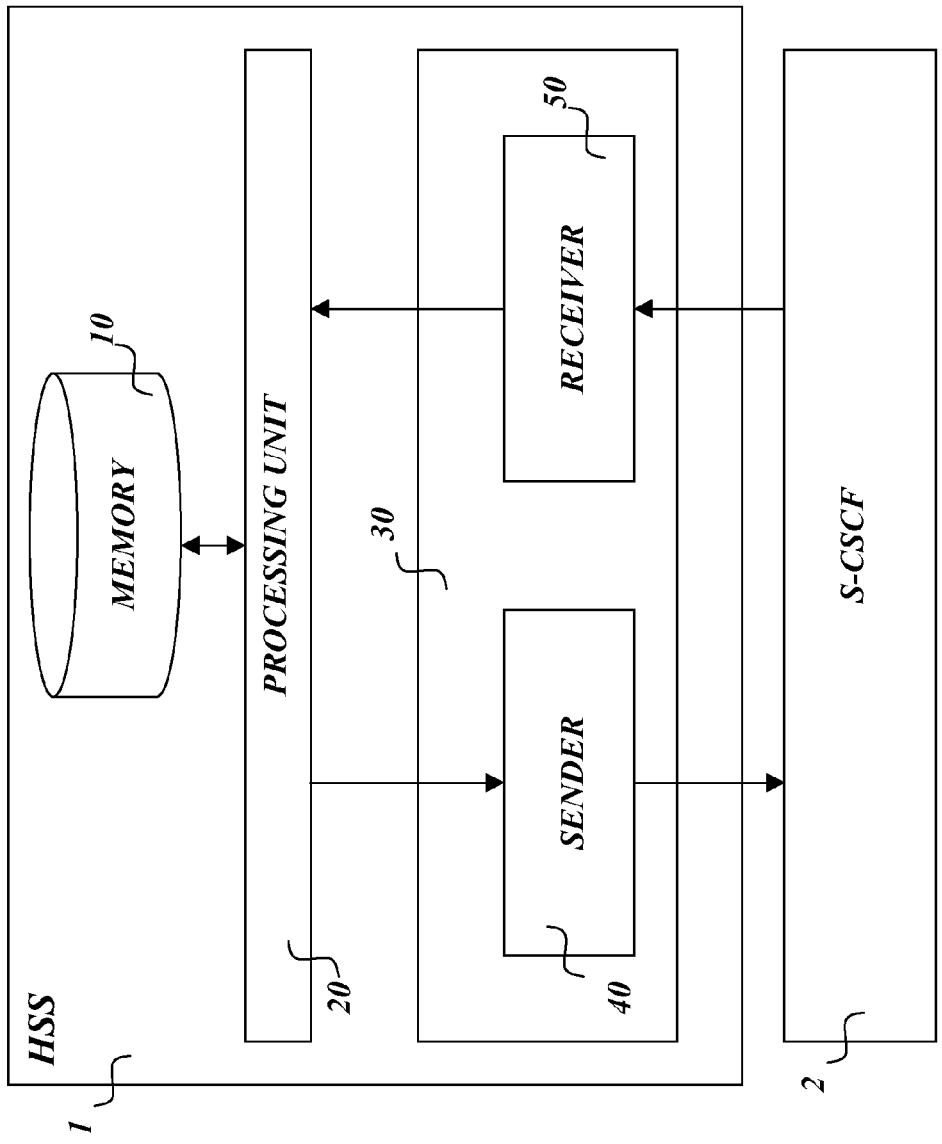
FIG. -6-

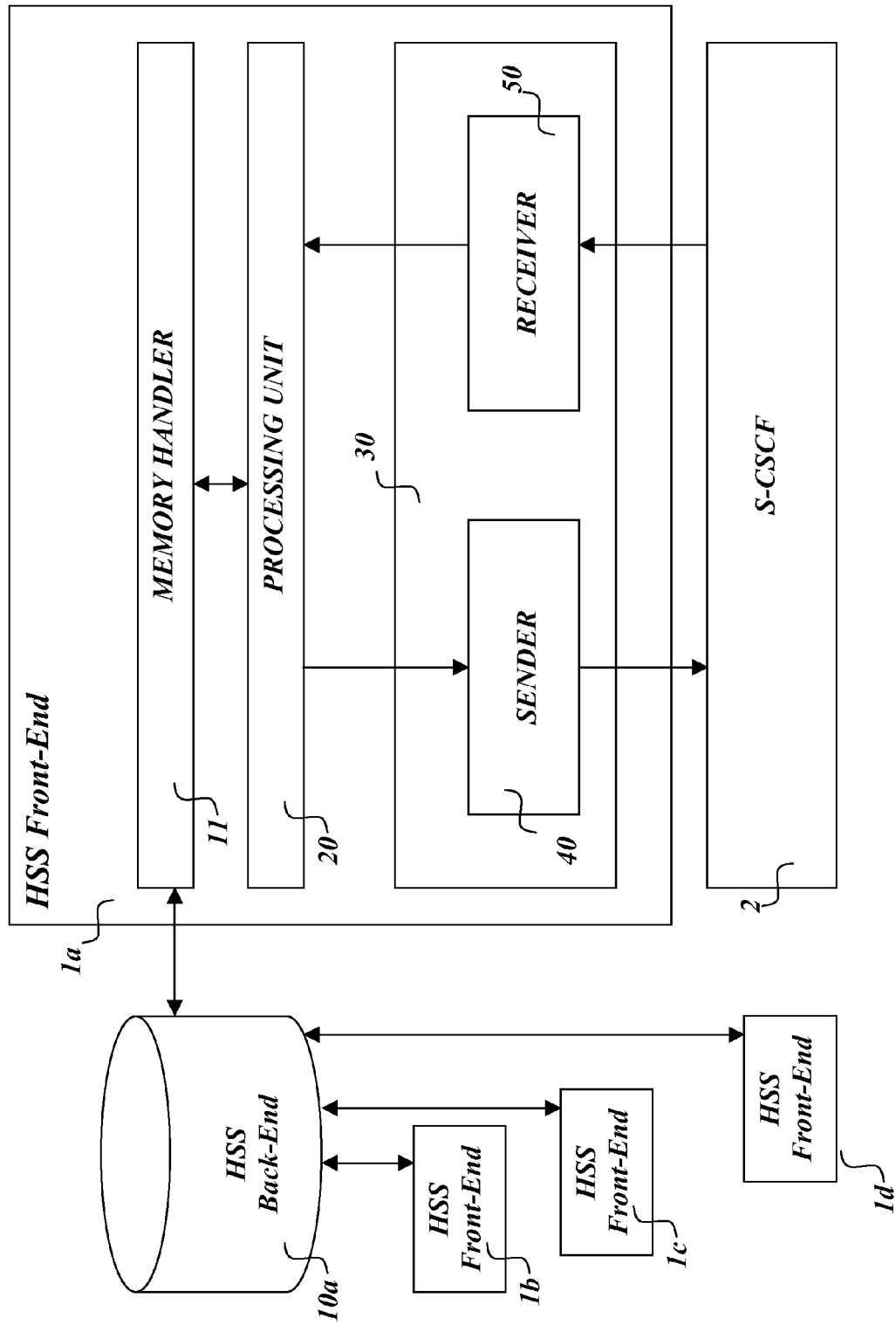
FIG. -7-

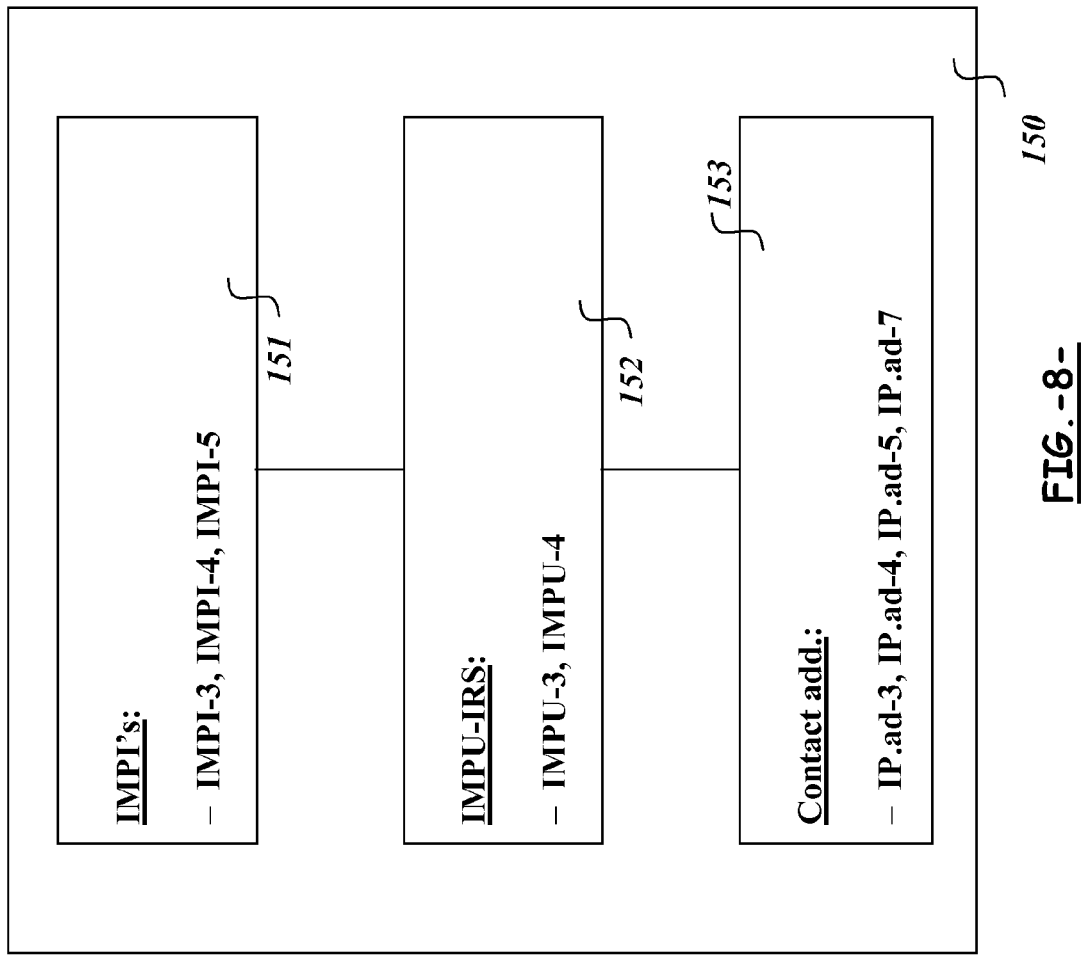
FIG. -8-

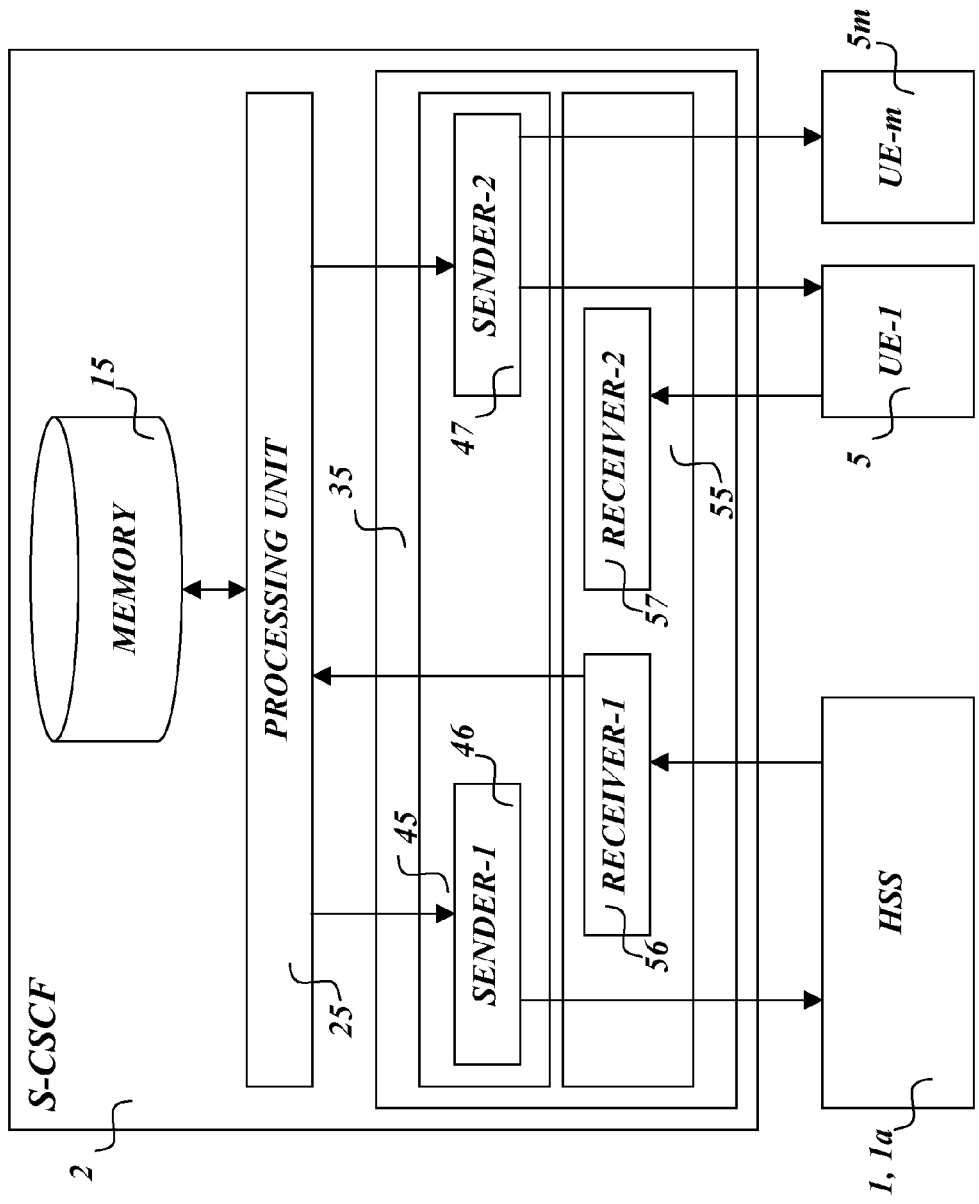
FIG. -9-

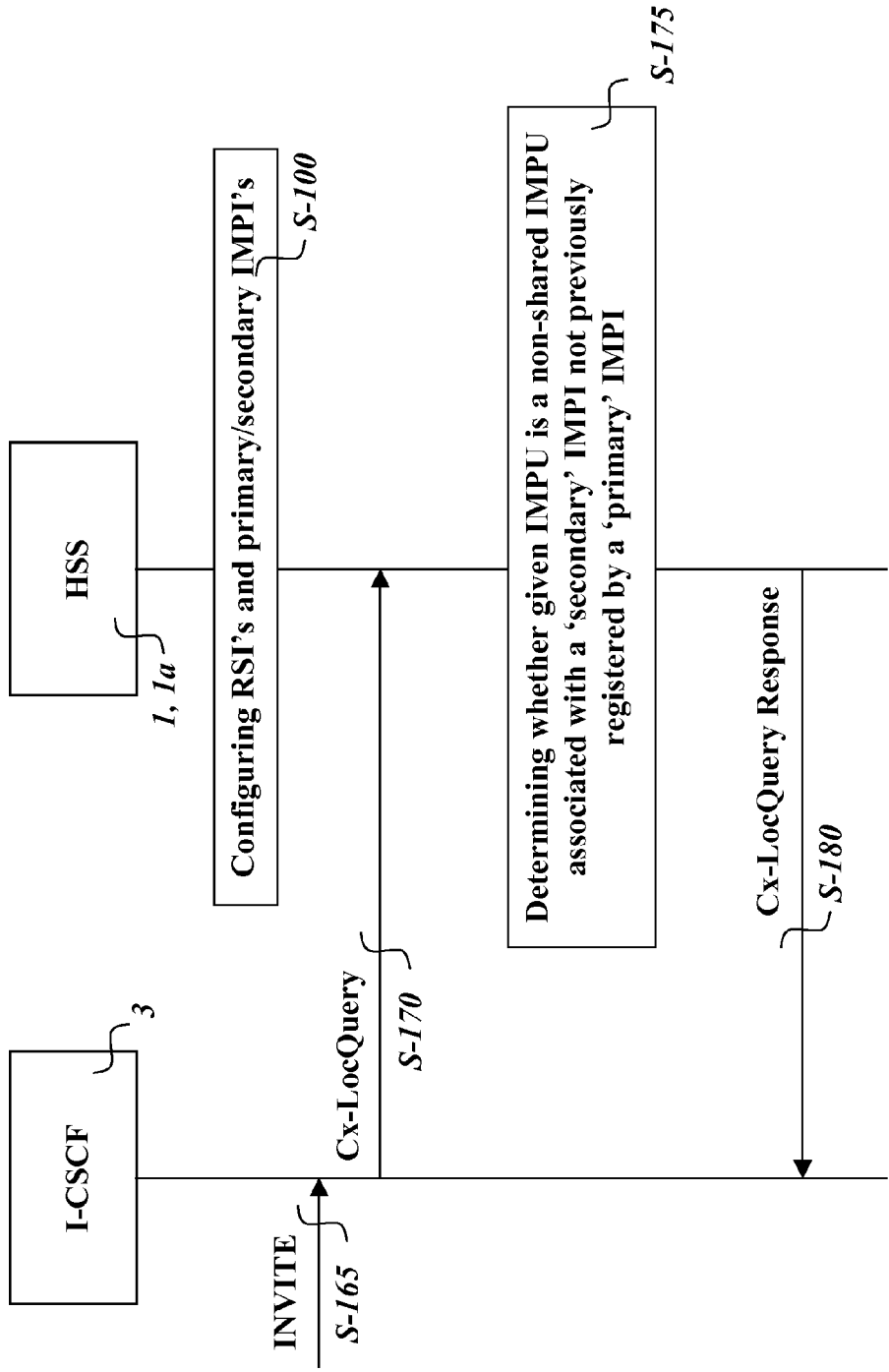
FIG. -10-

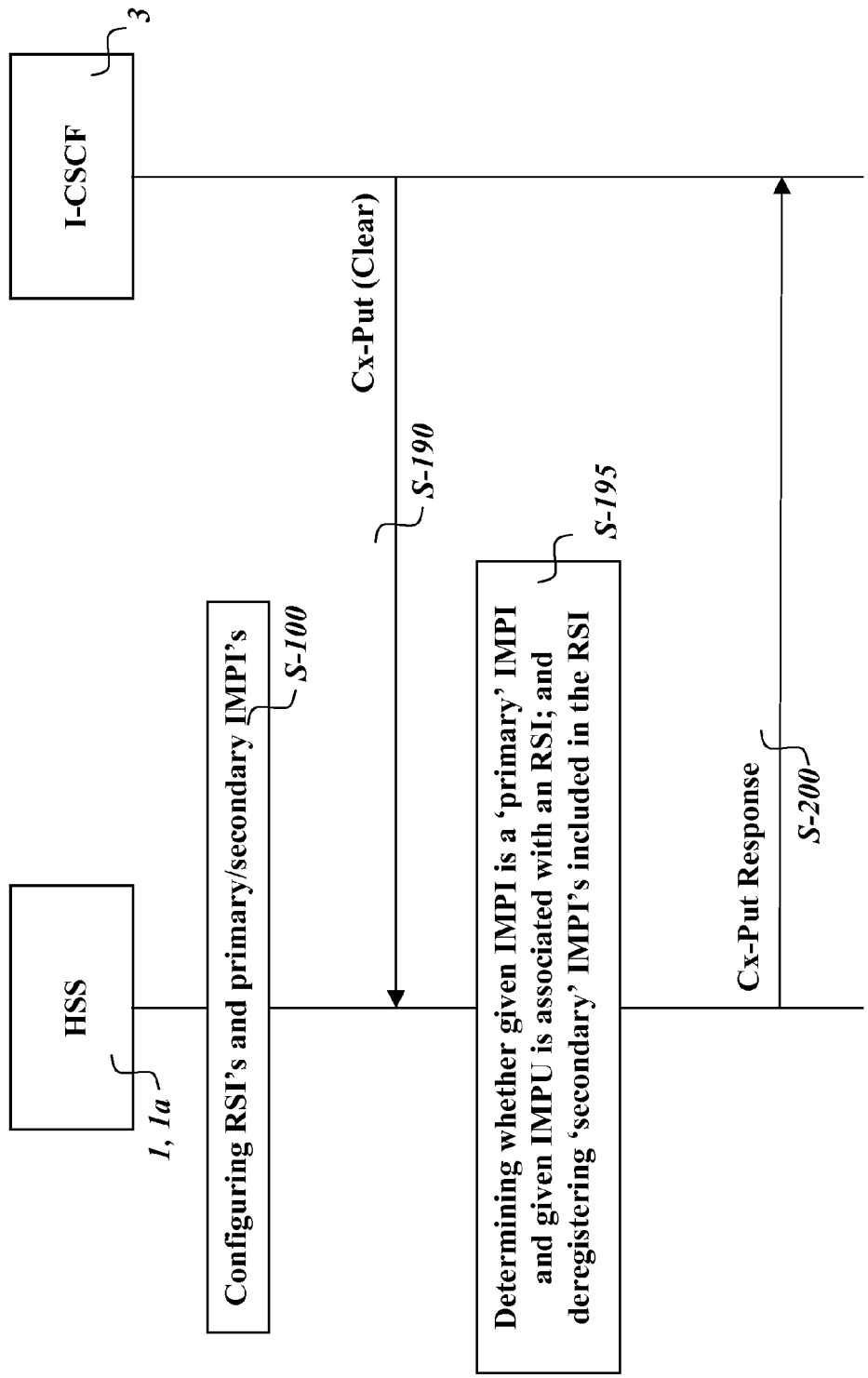
FIG. -11-

METHOD, APPARATUSES AND COMPUTER PROGRAM FOR PARENTAL CONTROL OVER CHILDREN'S ACTIVITIES IN AN IMS NETWORK

TECHNICAL FIELD

The present invention relates to parental control for accessing an IP Multimedia Subsystem network. More particularly, the invention pertains to means and method for an implicit registration of a number of Private User Identities of a subscriber of an IP Multimedia Subsystem upon an explicit registration of the subscriber in the IP Multimedia Subsystem with a given Private User Identity and a given Public User Identity.

BACKGROUND

3GPP defines an IP Multimedia Subsystem and, more specifically, the IP Multimedia Core Network Subsystem to enable support for IP multimedia applications. For the sake of simplicity, and since the IP Multimedia Subsystem is defined by 3GPP as being access-independent, all references are made throughout this specification to the IP Multimedia Subsystem (hereinafter IMS).

According to 3GPP, a user may register into the IMS network or receive a terminating call to experience IMS services. To this end, such user must be given a subscription to the IMS.

A user with an IMS subscription is given one or more Private User Identities. An IMS Private User Identity (hereinafter IMPI) is assigned by the home network operator, and is used for Registration, that is, for Authorization and Authentication into the IMS network. A user may also have one or more Public User Identities. An IMS Public User identity (hereinafter IMPU) is used by any user as a user's identifier for communications with other users.

Generally speaking, any IMPU of an IMS subscription may be shared by more than one IMPI within the same IMS subscription. In particular, an IMPU may be shared amongst all the IMPI's of an IMS subscription as stated in 3GPP TS 23.228. This feature is called IMPU sharing, and such IMPU is generally known under 3GPP as a 'shared IMPU'.

In this respect, FIG. 1 illustrates an exemplary IMS subscription in accordance with 3GPP, wherein "Public User Identity—3" and "Public User Identity—4" are both shared by all the IMPI's of the IMS subscription, namely "Private User Identity—1" and "Private User Identity—2", and are thus both considered 'shared IMPU's'.

On the one hand, an IMS subscriber may register into the IMS network with an IMPI/IMPU pair selected by the IMS subscriber amongst those IMPI's and IMPU's associated in the IMS subscription of the IMS subscriber. The IMS subscriber thus registers into the IMS with a 'Register' message of a Session Initiation Protocol (hereinafter SIP), as defined by 3GPP, and including a selected IMPU/IMPI pair. Moreover, 3GPP further discloses a so-called 'implicit registration set' (hereinafter IRS) of more than one IMPU so that, where a given IMPU registered in an IMPI/IMPU pair is included in an IRS, all the IMPU's included in said IRS are considered to be registered as well.

On the other hand, 3GPP TS 24.229 Rel-7 introduces the concept of contact addresses into the IMS network. In this respect, the contact address can be defined as a SIP Uniform Resource Identifier (hereinafter a 'SIP URI') containing the IP address of the user equipment (hereinafter UE). Under certain circumstances, a contact address may also contain an instance identifier that uniquely identifies a specific UE amongst all other UEs registered with a same IMPU. For the sake of simplicity, this contact address may indistinctly be referred to as 'contact address' or simply as 'contact' throughout this specification.

A conventional registration process includes the submission of a 'SIP Register' message from the IMS subscriber towards a so-called Proxy Call Session Control Function server (hereinafter P-CSCF), which forwards such message towards an Interrogating Call Session Control Function server (hereinafter I-CSCF) of the IMS network where the destination subscriber belongs to. In particular, this 'SIP Register' message includes a given IMPI/IMPU pair to be registered during this registration process, and a contact address associated with the currently used UE. The I-CSCF is in charge of selecting an appropriate Serving Call Session Control Function server (hereinafter S-CSCF) for serving the IMS subscriber, and queries a Home Subscriber Server (hereinafter HSS), which is in charge of subscription data for subscribers of the IMS network where the IMS subscriber belongs to, with the given IMPI/IMPU pair. Assuming that the IMS subscriber had not previously registered the IMPI/IMPU pair, the HSS returns the capabilities required for an S-CSCF to be assigned for serving the IMS subscriber. The I-CSCF receiving such capabilities selects an appropriate S-CSCF fulfilling the capabilities, and forwards the 'SIP Register' message with the IMPI/IMPU pair and the contact address thereto. The S-CSCF receiving the 'SIP Register' message submits its own registration towards the HSS to indicate it has been assigned for serving the subscriber identified by the IMPI/IMPU pair. The HSS then changes the status of said IMPI and IMPU from 'not registered' to 'registered', it stores a reference to the S-CSCF as being assigned for serving the IMS subscriber, and it downloads a user profile associated with said IMPU towards the S-CSCF. The S-CSCF receiving the user profile for the IMS subscriber and already having the given IMPI/IMPU pair and the contact address is now ready for serving the IMS subscriber.

In accordance with the current registration mechanism as described in 3GPP, an IMS subscriber is registered in the network with a given IMPU/IMPI pair and with a given contact address. Then, where the IMS subscriber wants to register with another IMPI of the same IMS subscription or with another contact address, the same previous registration mechanism can to be repeated with said another IMPI or another contact address. Regarding the registration of contacts, when the user initiates a new registration attempt, the new contact traverses the network within the SIP header until the 'SIP Register' message arrives to the S-CSCF. The S-CSCF stores the contact bound to the IMPU received in the SIP message or to the IRS received from HSS during the registration process.

At present, some network operators propose the concept of a so-called 'familiar subscription' as an IMS subscription consisting of several IMPI's identifying the members of the family or even the roles that each member play in the family. For instance, an exemplary 'familiar subscription' may consist of a first IMPI identifying the mother, a second IMPI identifying the father, a third IMPI identifying the daughter and a fourth IMPI identifying the son. With this approach, the operators can make special offers to families for contracting an IMS 'familiar subscription' and to charge them as a whole rather than independently for every member.

Nowadays, there are quite a few families with kids and teenagers, whose parents would like to have a control of the time their children spend with IMS services.

However, with the currently existing mechanisms for accessing the IMS network and for IMS session establishment, either terminating or originating session, there is no mechanism to exercise a parental control over children's activities in the IMS network.

SUMMARY

The present invention is aimed to at least minimize the above drawback and provides for a new IMS subscription model supporting a hierarchy of IMPI's, the so-called 'primary' IMPI's and the so-called 'secondary' IMPI's, whereby only the primary IMPI's are allowed to register themselves on their own, whereas the secondary IMPI's are not allowed to register themselves unless they have been previously registered by any primary IMPI. Therefore, a new method and an enhanced HSS are provided to allow the implicit registration of one or more secondary IMPI's upon the explicit registration of an IMS subscriber with a given IMPI/IMPU pair, wherein the given IMPI is a primary IMPI and the given IMPU is associated with a registration set of IMPI's which includes said one or more secondary IMPI's.

In accordance with a first aspect of the present invention, there is provided a new method of registering, during a single registration process in an IP Multimedia Subsystem "IMS", an implicit registration set of 'j' IMPI's.

This method comprises the steps of: configuring at a HSS an IMS subscription for a subscriber with a number 'n' of IMPI's and a number 'm' of IMPU's, wherein each IMPI is associated with at least one IMPU and each IMPU is associated with at least one IMPI, and wherein an IMPU is shared by more than one IMPI; configuring at the HSS this IMS subscription with an implicit registration set of 'j' IMPI's associated with the shared IMPU, wherein the 'j' IMPI's are preferably selected amongst the 'n' IMPI's in the IMS subscription; configuring at the HSS at least one IMPI as 'primary' IMPI and any other IMPI as 'secondary' IMPI of this IMS subscription; receiving at the HSS from a S-CSCF, which is currently assigned for serving the subscriber, an indication of a registration of said subscriber with a given IMPU and a given IMPI, and an identifier of said S-CSCF; determining at the HSS whether the given IMPI is configured as a 'primary' IMPI or as a 'secondary' IMPI; and either downloading from the HSS towards the S-CSCF the implicit registration set of 'j' IMPI's, where the given IMPI is a 'primary' IMPI and the given IMPU is the shared IMPU associated with the implicit registration set of 'j' IMPI's; or rejecting the registration of the subscriber with the given IMPU and given IMPI, where the given IMPI is a 'secondary' IMPI not previously registered by a 'primary' IMPI within an implicit registration set.

Generally speaking for this method, the shared IMPU associated with the implicit registration set of 'j' IMPI's is not necessarily an IMPU shared by all the IMPI's in the IMS subscription, in accordance with the concept of 'shared IMPU' stipulated by 3GPP, but simply an IMPU shared by the given IMPI and those IMPI's in the implicit registration set of 'j' IMPI's. In particular, the shared IMPU associated with the implicit registration set of 'j' IMPI's may be an IMPU shared by all the IMPI's in the IMS subscription, as stipulated by 3GPP.

An advantageous operation may be achieved, where this method further comprises a step of configuring at the HSS each 'secondary' IMPI of the IMS subscription as 'barred' for registration. In particular, this step of configuring each 'secondary' IMPI as 'barred' for registration may include a step of barring for own registration the 'secondary' IMPI, which is advantageous on the determination on whether the secondary IMPI may register itself or not.

Where the above barring mechanism is implemented, the step of determining in this method that the given IMPI is a 'primary' IMPI and the given IMPU is the shared IMPU associated with the implicit registration set of 'j' IMPI's further comprises a step of unbarring for own registration those 'secondary' IMPI's included in the implicit registration set of 'j' IMPI's.

Additionally, and in order to avoid that a kid previously registered by the parents further registers other kid prevented by the parents from registration, the step of configuring each 'secondary' IMPI as 'barred' for registration may include a step of barring the 'secondary' IMPI for registration of the implicit registration set of 'j' IMPI's associated with the given IMPU.

Moreover, apart from barring the own registration of a 'secondary' IMPI not previously registered by the parents, the parental control may be advantageously complemented by an effective control over call establishment procedures. To this end, the method may further comprise a step of configuring at the HSS each non-shared IMPU associated with each 'secondary' IMPI of the IMS subscription as 'barred' for call establishment.

Where this barring mechanism is implemented to control the call establishment procedures, the step of determining in this method that the given IMPI is a 'primary' IMPI and the given IMPU is the shared IMPU associated with the implicit registration set of 'j' IMPI's further comprises a step of unbarring for call establishment the non-shared IMPU's associated with each 'secondary' IMPI included in the implicit registration set of 'j' IMPI's.

An exemplary IMS familiar subscription may include, apart from the children to be carefully controlled by the parents, other family members responsible for their own registration but whom control of children cannot be given. This may be the case of an older brother who needs accessing the IMS services at any time but who should not be fully responsible of younger brothers. To this end, this method may further comprise a step of configuring at the HSS a 'primary' IMPI of the IMS subscription, the one for the exemplary older brother, as 'barred' for registration of any implicit registration set of 'j' IMPI's associated with a shared IMPU.

With this method, parents make sure that young children cannot access the IMS on their own at any time but only during fixed periods under their direct control or supervision, and this access to IMS services terminates for the young children as soon as the parents deregister the implicit registration set of 'j' IMPI's, including those 'secondary' IMPI's assigned to the children.

For this purpose, this method may further comprise the steps of: receiving at the HSS an indication of deregistering a subscriber with a given IMPI and a given IMPU from the S-CSCF; determining at the HSS that the given IMPI is a 'primary' IMPI and the given IMPU is the shared IMPU associated with the implicit registration set of 'j' IMPI's; and deregistering from the HSS all those 'secondary' IMPI's included in the implicit registration set of 'j' IMPI's with any IMPU they had previously been registered.

Where the above barring mechanism is implemented to control the own registration, the step of deregistering from the HSS all those 'secondary' IMPI's included in the implicit registration set of 'j' IMPI's may be followed by a step of barring for own registration at the HSS those 'secondary' IMPI's (included in the implicit registration set of 'j' IMPI's.

Likewise, where the above barring mechanism is implemented to control the call establishment procedures, the step of deregistering from the HSS all those 'secondary' IMPI's included in the implicit registration set of 'j' IMPI's may be followed by a step of barring for call establishment the non-shared IMPU's associated with each 'secondary' IMPI included in the implicit registration set of 'j' IMPI's.

Even though the step of downloading from the HSS towards the S-CSCF the implicit registration set of IMPI's associated with the given IMPU may be carried out at any time during or after concluding the registration process, advantages may be obtained in terms of data consistency and simplicity where said step of downloading the implicit registration set is carried out along with the downloading during the registration process, if any, of those IMPU's in an Implicit Registration Set associated with the given IMPU explicitly registered.

The method may be improved with additional steps in order to avoid a terminating call to reach a 'secondary' IMPI, which might occur under certain service criteria where said 'secondary' IMPI is not registered, since such terminating call may simply address an IMPU associated with the 'secondary' IMPI. To this end, this method may further comprise the steps of: receiving a query at the HSS from an I-CSCF, which is in charge of receiving an invitation to communicate with a terminating IMS subscriber, about a subscriber identified by a second given IMPU; determining at the HSS that the second given IMPU is a non-shared IMPU associated with a 'secondary' IMPI not previously registered by a 'primary' IMPI within an implicit registration set; and rejecting the query about the subscriber with the second given IMPU towards the I-CSCF.

In accordance with a second aspect of the present invention, there is provided a new HSS for holding subscriptions for subscribers of the IMS and arranged to configure and download an implicit registration set of 'j' IMS private identities.

This HSS comprises an accessible storage for configuring an IMS subscription for a subscriber with a number 'n' of IMPI's and a number 'm' of IMPU's, wherein each IMPI is associated with at least one IMPU and each IMPU is associated with at least one IMPI, and wherein an IMPU is shared by more than one IMPI; and wherein this accessible storage is arranged for configuring the IMS subscription for the subscriber with an implicit registration set of 'j' IMPI's associated with the shared IMPU, wherein the 'j' IMPI's are preferably selected amongst the 'n' IMPI's in the IMS subscription, and for configuring at least one IMPI in the IMS subscription as 'primary' IMPI and any other IMPI as 'secondary' IMPI of the IMS subscription for the subscriber. This HSS also comprises a receiver for receiving from a S-CSCF, which is assigned for serving the subscriber, an indication of a registration of said subscriber with a given IMPI and a given IMPU, and an identifier of said S-CSCF; and a processing unit for determining whether the given IMPU and the given IMPI are associated; wherein this processing unit is arranged for determining whether the given IMPI is a 'primary' IMPI or a 'secondary' IMPI, whether a 'secondary' IMPI has been previously registered within an implicit registration set, and whether the given IMPU is the shared IMPU associated with the implicit registration set of 'j' IMPI's. Moreover, this HSS also comprises a sender for downloading towards the S-CSCF the implicit registration set of 'j' IMPI's, where the given IMPI is a 'primary' IMPI and the given IMPU is the shared IMPU associated with the implicit registration set of 'j' IMPI's; or for rejecting the registration of the subscriber with the given IMPU and given IMPI towards the S-CSCF, where the given IMPI is a 'secondary' IMPI and the given IMPI has not previously been registered by a 'primary' IMPI within an implicit registration set.

As for the above method, and in order to benefit from data consistency and simplicity, the sender of the HSS may be arranged for downloading during the registration process the implicit registration set of 'j' IMPI's towards the S-CSCF along with an Implicit Registration Set of IMPU's, if any, associated with the given IMPU.

Aligned with the above method, the accessible storage of this HSS may advantageously include per 'secondary' IMPI of the IMS subscription a 'barring' indicator configured for barring an own registration of the 'secondary' IMPI, and may advantageously include per 'secondary' IMPI of the IMS subscription a 'barring' indicator configured for barring a registration of an implicit registration set of 'j' IMPI's. Where the accessible storage is arranged for barring an own registration of the 'secondary' IMPI, the processing unit may advantageously be arranged for unbarring and barring in the accessible storage the own registration of those 'secondary' IMPI's included in the implicit registration set of 'j' IMPI's.

Also aligned with the above method, the accessible storage of this HSS may advantageously include per each non-shared IMPU associated with each 'secondary' IMPI of the IMS subscription a 'barring' indicator configured for barring the non-shared IMPU for call establishment. Where the accessible storage is arranged for barring the non-shared IMPU for call establishment, the processing unit may advantageously be arranged for unbarring and barring in the accessible storage the call establishment for the non-shared IMPU's associated with each 'secondary' IMPI included in the implicit registration set of 'j' IMPI's.

In order to terminate the access to IMS services for the young children, the receiver of this HSS may be arranged for receiving from the S-CSCF an indication of deregistering a subscriber with a given IMPI and a given IMPU; and, responsive to this deregistration, the processing unit of the HSS may be arranged for determining that the given IMPI is a 'primary' IMPI and the given IMPU is the shared IMPU associated with the implicit registration set of 'j' IMPI's; and, in cooperation with the sender of the HSS, the processing unit may be arranged for deregistering towards the S-CSCF all those 'secondary' IMPI's included in the implicit registration set of 'j' IMPI's with any IMPU they had previously been registered.

Particularly advantageous for the above method to avoid a terminating call reaching a 'secondary' IMPI, the receiver of the HSS may be arranged for receiving a query from an I-CSCF, which is in charge of receiving an invitation to communicate with a terminating IMS subscriber, about a subscriber identified by a second given IMPU; and, responsive to this query, the processing unit of the HSS may be arranged for determining that the second given IMPU is a non-shared IMPU associated with a 'secondary' IMPI not previously registered by a 'primary' IMPI within an implicit registration set; and the sender of the HSS may be arranged for rejecting the query about the subscriber with the second given IMPU towards the I-CSCF.

In accordance with a third aspect of the present invention, there is provided a new S-CSCF for serving subscribers of the IMS. This S-CSCF comprises a sender for submitting towards a HSS, which holds subscriptions for subscribers of the IMS, an indication of a registration of an IMS subscriber with a given IMPU and a given IMPI, and an identifier of the S-CSCF; a receiver for receiving from the HSS an implicit registration set including a number 'j' of IMPI's associated with the given IMPU; a processing unit for determining that the given IMPI is a 'primary' IMPI of the IMS subscription; and an accessible storage for storing the 'primary' IMPI along with the implicit registration set of 'j' IMPI's, and the given IMPU explicitly registered.

In particular, the receiver of this S-CSCF may be arranged for receiving from the HSS an indication per IMPI in the implicit registration set of 'j' IMPI's indicating whether such IMPI is a 'primary' or 'secondary' IMPI of the IMS subscription. Also in particular, the processing unit may be arranged for determining that the given IMPI is a 'primary' IMPI of the IMS subscription in cooperation with the receiver receiving the indication per IMPI on whether such IMPI is a 'primary' or 'secondary' IMPI of the IMS subscription.

Moreover, the receiver of this S-CSCF may be arranged for receiving from the HSS a set with a number 'k' of contact addresses to reach those IMPI's currently registered; and the accessible storage may be arranged for storing the set of 'k' contact addresses in association with the IMPI's currently registered, and with the given IMPU explicitly registered.

On the other hand, the invention may be practised by a computer program, in accordance with a fourth aspect of the invention, the computer program being loadable into an internal memory of a computer with input and output units as well as with a processing unit, and comprising executable code adapted to carry out the above method steps. In particular, this executable code may be recorded in a carrier medium readable in the computer.

BRIEF DESCRIPTION OF THE DRAWINGS

The features, objects and advantages of the invention will become apparent by reading this description in conjunction with the accompanying drawings, in which:

FIG. 1 basically represents a conventional model of an IMS subscription, in respect of user identities and their relationships, as defined by 3GPP.

FIG. 2 shows a simplified view of an exemplary IMS familiar subscription to better describe embodiments of the invention.

FIG. 3 shows an exemplary configuration at the HSS of 'primary' and 'secondary' IMPI's along with respective implicit registration sets of contact addresses and 'barring' indicators per IMPI basis.

FIG. 4 shows an exemplary configuration at the HSS of implicit registration sets of IMPI's per IMPU basis along with respective implicit registration sets of IMPU's and 'barring' indicators.

FIG. 5 illustrates a simplified view of the sequence of actions to be performed to carry out a method of registering, during a single registration process in an IMS network, an implicit registration set of 'j' IMPI's, in accordance with an aspect of the present invention.

FIG. 6 illustrates an exemplary implementation of a HSS provided for configuring and downloading an implicit registration set of 'j' IMPI's, wherein the accessible storage is provided by an internal memory integrated into the HSS.

FIG. 7 illustrates an exemplary implementation of a HSS provided for configuring and downloading an implicit registration set of 'j' IMPI's, wherein the accessible storage is provided by an external database acting as an HSS back-end shared by a plurality of HSS front-ends.

FIG. 8 shows an exemplary data model of implicit registration sets of IMPI's and contact addresses built up at the S-CSCF, and downloaded from the HSS, in accordance with the exemplary IMS subscription illustrated in FIG. 2.

FIG. 9 illustrates an exemplary implementation of an S-CSCF provided for downloading an implicit registration set of 'j' IMPI's, and for building up a data model thereof.

FIG. 10 illustrates a simplified view of the sequence of actions to carry out to avoid a terminating call reaching a 'secondary' IMPI not previously registered by a 'primary' IMPI within an implicit registration set of 'j' IMPI's.

FIG. 11 illustrates a simplified view of the sequence of actions to carry out for deregistering all those 'secondary' IMPI's included in the implicit registration set of 'j' IMPI's upon deregistration of the 'primary' IMPI.

DETAILED DESCRIPTION

The following describes currently preferred embodiments of means and method for registering an implicit registration of one or more secondary IMPI's upon the explicit registration of an IMS subscriber with a given IMPI/IMPU pair, wherein the given IMPI is a primary IMPI and the given IMPU is associated with a registration set of IMPI's which includes said one or more secondary IMPI's.

FIG. 2 illustrates an exemplary IMS familiar subscription 100 for a subscriber of an IMS network, the IMS subscription including a number of IMPI's 101-106 assignable for usage to family members, and another number of IMPU's 107-115 wherein some of them are exclusive of some family member whereas others are shared by several or all family members. In this exemplary IMS subscription 100 the first IMPU 107 is exclusively associated with the first IMPI 101 assigned to the mother; the second IMPU 108 is exclusively associated with the second IMPI 102 assigned to the father; the third IMPU 109 and the fourth IMPU 110 are shared IMPU's associated with all the IMPI's of the IMS subscription; the fifth IMPU 111 is a shared IMPU associated with the first IMPI 101 assigned to the mother, with the second IMPI 102 assigned to the father, and with the fourth IMPI 104 assigned to the son; the sixth IMPU 112 is exclusively associated with the fourth IMPI 104 assigned to the son; the seventh IMPU 113 is a shared IMPU associated with the first IMPI 101 assigned to the mother, with the second IMPI 102 assigned to the father, and with the fifth IMPI 105 assigned to the daughter; the eighth IMPU 114 is exclusively associated with the fifth IMPI 105 assigned to the daughter; and the ninth IMPU 115 is exclusively associated with the sixth IMPI 106 assigned to an older son.

In accordance with the invention, there is at least one registration set of IMPI's (hereinafter RSI) associated with a shared IMPU and to be implicitly registered upon registration of a given IMPI/IMPU pair, wherein the given IMPI is configured as a 'primary' IMPI associated with the given IMPU and the latter being the shared IMPU associated with the RSI.

As illustrated in FIG. 2 for the exemplary IMS familiar subscription 100, a first RSI 116 is associated with the shared IMPU 109 and including the first IMPI 101, second IMPI 102, fourth IMPI 104 and fifth IMPI 105. Likewise, a second RSI 117 is associated with the shared IMPU 110 and including the fourth IMPI 104 and fifth IMPI 105; a third RSI 118 is associated with the shared IMPU 111 and just including the fourth IMPI 104; and a fourth RSI 119 is associated with the shared IMPU 113 and just including the fifth IMPI 105.

Particularly in this exemplary subscription, some shared IMPU's, namely the third IMPU 109 and the fourth IMPU 110, are shared IMPU's in accordance with the stipulations made by 3GPP whereby a shared IMPU is shared by all the IMPI's in the IMS subscription, whereas other shared IMPU's, namely the fifth IMPU 111 and the seventh IMPU 113, are shared IMPU's in accordance with a less restrictive concept used throughout this specification in the sense that they are shared by more than one IMPI of the IMS subscription.

Also in this exemplary IMS subscription, there is provided a third IMPI 103 assignable to the parents, being the mother or the father, associated with the third IMPI 103 and fourth IMPI 104 for the purpose of registering at home any of these shared IMPI 103 and fourth IMPI 104, and usable to allow the implicit registration of IMPI's assigned to the younger kids whilst keeping the parents exclusive IMPI's 101-102 in a separate registration status.

FIG. 3 illustrates an exemplary configuration 120 at the HSS with configuration elements 121-126 per IMPI basis in accordance with the exemplary IMS subscription 100 illustrated in FIG. 2. This exemplary configuration 120 per IMPI basis includes information on whether each IMPI is a 'primary' or 'secondary IMPI, and may advantageously include 'barring' indicators and respective implicit registration sets of contact addresses where each IMPI may be reachable.

In this respect, and for the sake of simplicity with regard to the exemplary IMS subscription 100 illustrated in FIG. 2, IMPU's 107 to 115 are supposed to be reachable in contact addresses IP.ad-1 to IP.ad-9, though other arrangements, including more than one contact address per each IMPU, are also possible.

Thus, as illustrated in FIG. 3, a first configuration element 121 is provided for the first IMPI 101 configured as 'primary' IMPI; associated with first IMPU 107, third IMPU 109, fourth IMPU 110, fifth IMPU 111 and seventh IMPU 113; having a set of contact addresses comprising IP.ad-3, IP.ad-4, IP.ad-5 and IP.ad-7; and having no barring indicator active. A second configuration element 122 is provided for the second IMPI 102 configured as 'primary' IMPI; associated with second IMPU 108, third IMPU 109, fourth IMPU 110, fifth IMPU 111 and seventh IMPU 113; having a set of contact addresses comprising IP.ad-3, IP.ad-4, IP.ad-5 and IP.ad-7; and having no barring indicator active. A third configuration element 123 is provided for the third IMPI 103 configured as 'primary' IMPI; associated with third IMPU 109 and fourth IMPU 110; having a set of contact addresses comprising IP.ad-3, IP.ad-4, IP.ad-5 and IP.ad-7; and having no barring indicator active. A fourth configuration element 124 is provided for the fourth IMPI 104 configured as 'secondary' IMPI; associated with third IMPU 109, fourth IMPU 110, fifth IMPU 111 and sixth IMPU 112; having a set of contact addresses comprising IP.ad-3, IP.ad-4, IP.ad-5 and IP.ad-6; and having a barring indicator active for own registration and for registration of any RSI. A fifth configuration element 125 is provided for the fifth IMPI 105 configured as 'secondary' IMPI; associated with third IMPU 109, fourth IMPU 110, seventh IMPU 113 and eighth IMPU 114; having a set of contact addresses comprising IP.ad-3, IP.ad-4, IP.ad-7 and IP.ad-8; and having a barring indicator active for own registration and for registration of any RSI. A sixth configuration element 126 is provided for the sixth IMPI 106 configured as 'primary' IMPI; associated with third IMPU 109, fourth IMPU 110 and ninth IMPU 115; having a set of contact addresses comprising IP.ad-3, IP.ad-4 and IP.ad-9; and having a barring indicator active only for registration of any RSI.

FIG. 4 illustrates an exemplary configuration 130 at the HSS with configuration elements 131-139 per IMPU basis in accordance with the exemplary IMS subscription 100 illustrated in FIG. 2. This exemplary configuration 130 per IMPU basis includes information on whether each IMPU is associated with an RSI, or with an implicit registration set of IMPU's, and may advantageously include 'barring' indicators for call establishment.

Thus, as illustrated in FIG. 4, a first configuration element 131 is provided for the first IMPU 107, not associated with any implicit registration set of IMPU's; not associated with any RSI; and not barred for call establishment. A second configuration element 132 is provided for the second IMPU 108, not associated with any implicit registration set of IMPU's; not associated with any RSI; and not barred for call establishment. A third configuration element 133 is provided for the third IMPU 109, associated with an implicit registration set of IMPU's that includes the third IMPU 109 and the fourth IMPU 110; associated with a first RSI 116 that includes the first IMPI 101, the second IMPI 102, the fourth IMPI 104 and the fifth IMPI 105; and not barred for call establishment. A fourth configuration element 134 is provided for the fourth IMPU 110, associated with an implicit registration set of IMPU's that includes the third IMPU 109 and the fourth IMPU 110; associated with a second RSI 117 that includes the fourth IMPI 104 and the fifth IMPI 105; and not barred for call establishment. A fifth configuration element 135 is provided for the fifth IMPU 111, not associated with any implicit registration set of IMPU's; associated with a third RSI 118 that just includes the fourth IMPI 104; and not barred for call establishment. A sixth configuration element 136 is provided for the sixth IMPU 112, not associated with any implicit registration set of IMPU's; not associated with any RSI; and barred for call establishment, since it is a non-shared IMPU exclusively associated with a 'secondary' IMPI such as the fourth IMPI 104. A seventh configuration element 137 is provided for the seventh IMPU 113, not associated with any implicit registration set of IMPU's; associated with a fourth RSI 119 that just includes the fifth IMPI 105; and not barred for call establishment. An eighth configuration element 138 is provided for the eighth IMPU 114, not associated with any implicit registration set of IMPU's; not associated with any RSI; and barred for call establishment, since it is a non-shared IMPU exclusively associated with a 'secondary' IMPI such as the fifth IMPI 105. A ninth configuration element 139 is provided for the ninth IMPU 1115, not associated with any implicit registration set of IMPU's; not associated with any RSI; and not barred for call establishment.

Other combinations and data distributions are also possible in the light of the above exemplary embodiments exemplified with configuration elements 120 and 130. For example, where no implicit registration set of contact addresses is configured.

In operation, once a subscriber has registered in an access network and has gotten IP connectivity, such subscriber may register into the IMS network. To this end, the method illustrated in FIG. 5 may be followed to register a subscriber with a UE 5 in the IMS network. In this respect, the present specification assumes the exemplary IMS subscription 100 illustrated in FIG. 2 for exemplary describing the sequence of actions to be carried out in an illustrative and non-restrictive manner.

Conventionally, this method includes a step not illustrated in any drawing of configuring at a HSS 1 or 1*a*, which holds subscriptions for subscribers of the IMS, the exemplary IMS subscription 100 for a subscriber with a number 'n' of IMPI's 101-106 and a number 'm' of IMPU's 107-115, wherein each IMPI is associated with at least one IMPU and each IMPU is associated with at least one IMPI, and wherein some IMPU's 109-111 or 113 may be shared by more than one IMPI.

As illustrated in FIG. 5, this method starts with a step S-100 carried out at the HSS 1 or 1*a* of configuring the IMS subscription for the subscriber with an implicit registration set 117 of 'j' IMPI's associated with a shared IMPU 110; and configuring an exemplary number of IMPI's 101-103 and 106 as 'primary' IMPI's, whereas the other IMPI's 104-105 are configured as 'secondary' IMPI's of this IMS subscription.

The method illustrated in FIG. 5 continues with the explicit registration of the subscriber with UE 5 into the IMS. To this end, the UE 5 submits a register message during a step S-105 towards a P-CSCF 4 for accessing the IMS network. This register message includes a given IMPI and a given IMPU to be registered during this registration process, and a contact address associated with the currently used UE 5. In accordance with the invention, several embodiments are provided depending on whether the given IMPI is a 'primary' IMPI or a 'secondary' IMPI.

In a first embodiment, the IMS subscriber attempts to register with a given 'secondary' IMPI and a given IMPU. For example, where the UE 5 submits a register message during the step S-105 towards a P-CSCF 4 including a given IMPI 104 and a given IMPU 110 to be registered during this registration process, and a contact address associated with the currently used UE 5.

The P-CSCF 4 forwards such message during a step S-110 towards an I-CSCF 3 of the IMS network where the IMS subscriber belongs to. The I-CSCF is in charge of selecting an appropriate S-CSCF for serving the IMS subscriber, and queries during a step S-115 the HSS 1 or 1*a* with the given IMPI/IMPU pair and a network identifier of the P-CSCF 4.

Assuming that the IMS subscriber had not previously registered with the given IMPI 104 and given IMPU 110 pair, the HSS 1 or 1*a* returns during a step S-120 the capabilities required for an S-CSCF to be assigned for serving the IMS subscriber. The I-CSCF 3 receiving such capabilities selects an appropriate S-CSCF 2 fulfilling the capabilities, and forwards the register message during a step S-125 with the given IMPI/IMPU pair and the contact address towards said S-CSCF 2. The S-CSCF 2 receiving the register message submits during a step S-130 its own registration towards the HSS 1 or 1*a* to indicate it has been assigned for serving the subscriber identified by the given IMPI 104 and given IMPU 110.

The HSS 1 or 1*a*, as receiving such indication of a registration of the subscriber with a given IMPU 110 and a given IMPI 104, and an identifier of said S-CSCF 2, determines during a step S-135 whether the given IMPI 104 is configured as a 'primary' IMPI or as a 'secondary' IMPI; and, since the given IMPI 104 is a 'secondary' IMPI not previously registered by a 'primary' IMPI 101-103 within an implicit registration set, the HSS rejects during a step S-140 such registration with the given IMPI 104 and given IMPU 110 towards the S-CSCF.

The S-CSCF receiving such rejection for the registration of the IMS subscriber with the given IMPI/IMPU pair, confirms back such rejection to the I-CSCF 3 during a step S-145, and this rejection is confirmed back from the I-CSCF towards the P-CSCF 4 during a step S-150 and from the P-CSCF 4 towards the UE 5 during a step S-155.

In a second embodiment, the IMS subscriber attempts to register with a given 'primary' IMPI and a given IMPU. In this respect, the same sequence of actions illustrated in FIG. 5 may be followed where the IMS subscriber attempts to register with a given 'primary' IMPI and a given IMPU. For example, where the UE 5 submits a register message during the step S-105 towards a P-CSCF 4 including a given IMPI 103 and a given IMPU 110 of the exemplary IMS subscription 100 illustrated in FIG. 2, to be registered during this registration process, and a contact address associated with the currently used UE 5.

The P-CSCF 4 forwards such message during a step S-110 towards an I-CSCF 3 and the latter queries during a step S-115 the HSS 1 or 1*a* with the given IMPI/IMPU pair and a network identifier of the P-CSCF 4. Assuming that the IMS subscriber had not previously registered with the given IMPI 103 and given IMPU 110 pair, the HSS 1 or 1*a* returns during a step S-120 the capabilities required for an S-CSCF to be assigned for serving the IMS subscriber. The I-CSCF 3 receiving such capabilities selects the S-CSCF 2 and forwards the register message during a step S-125 with the given IMPI/IMPU pair and the contact address towards said S-CSCF 2. The S-CSCF 2 receiving the register message submits during a step S-130 its own registration towards the HSS 1 or 1*a* to indicate it has been assigned for serving the subscriber identified by the given IMPI 103 and given IMPU 110.

The HSS 1 or 1*a*, as receiving the indication of the registration of the subscriber with a given IMPU 110 and a given IMPI 103, and an identifier of said S-CSCF 2, determines during a step S-135 whether the given IMPI 103 is configured as a 'primary' IMPI or as a 'secondary' IMPI; and, since the given IMPI 103 is a 'primary' IMPI, the HSS determines whether the given IMPU 110 is a shared IMPU associated with any implicit registration set of 'j' IMPI's. In the present case, the given IMPU 110 is the shared IMPU associated with the implicit registration set 117 of 'j' IMPI's, so that the HSS registers the 'j' IMPI's 104-105 along with the given IMPI 103 and, during a step S-140, downloads towards the S-CSCF the implicit registration set 117 of 'j' IMPI's.

In addition or complementary to these actions, the HSS may carry out at this stage the conventional steps of marking said IMPI's 103-105 and IMPU 110 as 'registered', storing a reference to the S-CSCF as been assigned for serving the IMS subscriber, and downloading a user profile associated with the given IMPU 110 towards the S-CSCF. Moreover, this user profile may also include a conventional Implicit Registration Set of IMPU's 109-110 associated with the given IMPU, as illustrated in the configuration element 133 of FIG. 4. Furthermore, the HSS may also download towards the S-CSCF 2 a set of contact addresses IP.ad-3, IP.ad-4, IP.ad-5 and IP.ad-7 associated with the given IMPI 103, as illustrated in the configuration element 123 of FIG. 3.

The S-CSCF 2, as receiving the implicit registration set 117 of 'j' IMPI's, may build up a data model 150, exemplary illustrated in FIG. 8, and comprising: a set 151 of IMPI's that includes the given IMPI 103 explicitly registered and the implicit registration set of IMPI's 104-105, a set 152 of IMPU's that includes the given IMPU 110 explicitly registered and an Implicit Registration Set of IMPU's 109-110, and a set 153 of contact addresses, if any, for the given IMPI.

The S-CSCF receiving the user profile for the IMS subscriber and already having the given IMPI/IMPU pair and the contact address originally received in the registration message is now ready for serving the IMS subscriber. As illustrated in FIG. 5, this is confirmed from the S-CSCF 2 back to the I-CSCF 3 during a step S-145, and this confirmation is forwarded from the I-CSCF towards the P-CSCF 4 during a step S-150 and from the latter towards the UE 5 during a step S-155.

In order to carry out the method illustrated in FIG. 5, there is provided an enhanced HSS 1 or 1*a*, as illustrated in FIG. 6 and FIG. 7, and an enhanced S-CSCF 2, as illustrated in FIG. 9.

Thus, the HSS 1 or 1*a* illustrated in FIG. 6 and FIG. 7 comprises an accessible storage for configuring an IMS subscription for each IMS subscriber, wherein the IMS subscription includes more than one IMPI 101-106 and more than one IMPU 107-115, wherein each IMPI is associated with at least one IMPU and each IMPU is associated with at least one IMPI, and wherein at least one IMPU 109-111 and 113 is shared by more than one IMPI.

This accessible storage is arranged for configuring the IMS subscription for the subscriber with an implicit registration set 117 of 'j' IMPI's associated with the shared IMPU 110, wherein the 'j' IMPI's are preferably selected amongst the 'n' IMPI's in the IMS subscription, and for configuring at least one IMPI 101-103 or 106 in the IMS subscription as 'primary' IMPI and any other IMPI 104-105 as 'secondary' IMPI of the IMS subscription for the subscriber In particular, as illustrated in FIG. 7, the accessible storage in the HSS may include an external database 10a acting as an HSS back-end shared by a plurality of HSS front-ends 1a-1d, and a memory handler 11 for interfacing with the external database. Alternatively, as illustrated in FIG. 6, the accessible storage in the HSS may be provided as an internal memory 10.

This HSS also comprises a receiver 50 for receiving from the S-CSCF 2 an indication of the registration of said subscriber with the given IMPU 110 and the given IMPI 103, and an identifier of said S-CSCF; a processing unit 20 for determining whether the given IMPU 110 and the given IMPI 103 are associated, and wherein this processing unit is arranged for determining whether the given IMPI 103 is a 'primary' IMPI or a 'secondary' IMPI, whether a 'secondary' IMPI 104 has been previously registered within an implicit registration set, and whether the given IMPU 110 is the shared IMPU associated with the implicit registration set 117 of 'j' IMPI's.

Moreover, this HSS also comprises a sender 40 for downloading towards the S-CSCF 2 the implicit registration set 117 of 'j' IMPI's, where the given IMPI 103 is a 'primary' IMPI and the given IMPU 110 is the shared IMPU associated with the implicit registration set 117 of 'j' IMPI's; or for rejecting the registration of the subscriber with the given IMPU and given IMPI towards the S-CSCF 2, where the given IMPI 104 is a 'secondary' IMPI not previously registered by a 'primary' IMPI within an implicit registration set.

Furthermore, the sender 40 of this HSS may be arranged for downloading towards the S-CSCF, along with the implicit registration set 117 of 'j' IMPI's, a set of contact addresses IP.ad-3, IP.ad-4, IP.ad-5 and IP.ad-7 associated with the given IMPI 103 and usable to reach at least one IMPI selected amongst the set 151 of IMPI's in a number of fixed and mobile devices.

Correspondingly, the S-CSCF 2 illustrated in FIG. 9 comprises a sender 46 for submitting towards the HSS 1 or 1a an indication of a registration of an IMS subscriber with the given IMPU 110 and the given IMPI 103, and an identifier of the S-CSCF; a receiver 56 for receiving from the HSS 1 or 1a the implicit registration set 117 of 'j' IMPI's associated with the given IMPU 110; a processing unit 25 for determining that the given IMPI 103 is a 'primary' IMPI of the IMS subscription; and an accessible storage 15 for storing a set of IMPI's 151 including the 'primary' IMPI 103 along with the IMPI's 104-15 in the implicit registration set 117 of 'j' IMPI's, and a set of IMPU's 152 including the given IMPU 110 explicitly registered.

Moreover, the receiver 56 of the S-CSCF may be arranged for receiving from the HSS 1 or 1a, along with the implicit registration set 117 of 'j' IMPI's, a set of contact addresses IP.ad-3, IP.ad-4, IP.ad-5 and IP.ad-7 associated with the given IMPI 103, and the accessible storage 15 may be arranged for storing the set of contact addresses in a set 153 of the data model shown in FIG. 8.

Generally speaking, the contact addresses are usable to reach at least one IMPI selected amongst the given IMPI and the set 151 of IMPI's in a number of fixed and mobile devices. To this end, S-CSCF illustrated in FIG. 9, may further comprise a second sender 47 arranged for using the contact addresses to reach at least one IMPI selected amongst the set 151 of IMPI's in a number of fixed and mobile devices 5-5m. More precisely, the processing unit 25 of the S-CSCF may be arranged for instructing the second sender 47 to submit a message addressing the at least one IMPI towards a number of fixed and mobile devices 5-5m identified by the contact addresses received from the HSS 1 or 1a.

In particular, the S-CSCF 2 illustrated in FIG. 9 also includes a second receiver 57 for receiving during the step S-125 the registration message originated from the UE 5 with the given IMPI 103, the given IMPU 110 and the given contact address.

In particular, the S-CSCF 2 may be implemented so that the first and second receivers 56 and 57, or the first and second senders 46 and 47, are a same receiver 55 or sender 45 respectively, or even a unique input/output unit 35.

Back to the first embodiment of the method illustrated in FIG. 5, whereby the registration of an IMS subscriber with a given 'secondary' IMPI 104 and a given IMPU 110 is rejected if the 'secondary' IMPI 104 had not previously been registered by a 'primary' IMPI 101-103, this method may further comprise additional steps to avoid a terminating call reaching the 'secondary' IMPI.

As illustrated in FIG. 10, and upon receiving at the I-CSCF 3 an invitation to complete a terminating call, during a step S-165, for an IMS subscriber identified by a given second IMPU 114, which is a non-shared IMPU associated with the 'secondary' IMPI 105 in the exemplary IMS subscription 100 shown in FIG. 2, the I-CSCF sends a query during a step S-170 towards the HSS 1 or 1a, inquiring about the subscriber identified by the second given IMPU 114. As receiving this query, the HSS determines during a step S-175 that the second given IMPU 114 is a non-shared IMPU associated with a 'secondary' IMPI 105 not previously registered by a 'primary' IMPI 101-103 within an implicit registration set; and rejects during a step S-180 such query about the subscriber with the second given IMPU 114 towards the I-CSCF 3.

In order to carry out the method steps illustrated in FIG. 10, an enhanced HSS 1 or 1a is provided wherein the receiver 50 may be arranged for receiving the query from the I-CSCF 3 about the subscriber identified by the second given IMPU 114; and, responsive to this query, the processing unit 20 may be arranged for determining that the second given IMPU 114 is a non-shared IMPU associated with a 'secondary' IMPI 105 not previously registered by a 'primary' IMPI within an implicit registration set; and the sender 40 may be arranged for rejecting the query about the subscriber with the second given IMPU 114 towards the I-CSCF 3.

Back to the second embodiment of the method illustrated in FIG. 5, whereby the registration of an IMS subscriber with a given 'primary' IMPI 103 and a given IMPU 110 triggers the registration of an implicit registration set 117 of 'j' IMPI's 104 and 105, this method may further comprise additional steps to terminate the registration of, at least, the 'secondary' IMPI's in the implicit registration set 117 of 'j' IMPI's.

As illustrated in FIG. 11, and assuming the IMPI's in the IMS subscription 100 illustrated in FIG. 2 have been configured as 'primary' or 'secondary' IMPI's, the HSS 1 or 1a may receive during a step S-190 an indication of deregistering a subscriber with a given IMPI 103 and a given IMPU 110 from the S-CSCF 2. Then, the HSS may determine during a step S-195 that the given IMPI is a 'primary' IMPI and the given IMPU is the shared IMPU associated with the implicit registration set 117 of 'j' IMPI's; and the HSS may deregister during a step S-195 all those 'secondary' IMPI's 104-105 included in the implicit registration set 117 of 'j' IMPI's with any IMPU they had previously been registered.

Particularly applicable for other embodiments not illustrated in any drawing, namely where the implicit registration set of 'j' IMPI's includes 'primary' and 'secondary' IMPI's, the HSS may deregister during the step S-195 all those IMPI's included in the implicit registration set of 'j' IMPI's and not only those configured as 'secondary' IMPI's.

In order to carry out the method steps illustrated in FIG. 11, an enhanced HSS 1 or 1a is provided wherein the receiver 50 may be arranged for receiving from the S-CSCF 2 an indication of deregistering a subscriber with the given IMPI 103 and the given IMPU 110; and, responsive to this deregistration, the processing unit 20 may be arranged for determining that the given IMPI 103 is a 'primary' IMPI and the given IMPU 110 is the shared IMPU associated with the implicit registration set 117 of 'j' IMPI's; and wherein both the sender 40 in cooperation with the processing unit 20 may be arranged for deregistering towards the S-CSCF 2 all those 'secondary' IMPI's included in the implicit registration set of 'j' IMPI's with any IMPU they had previously been registered, or all those IMPI's included in the implicit registration set of 'j' IMPI's and not only those configured as 'secondary' IMPI's, choice which may be determined by a first configurable parameter set during the configuration step.

In another embodiment of the invention not illustrated in any drawing, there is provided a second configurable parameter set during the configuration step to determine whether just the exemplary RSI 117 associated with the shared IMPU 110, which includes the fourth IMPI 104 and the fifth IMPI 105, is the only one to be implicitly registered, or also those RSI's associated with other shared IMPU's in a same Implicit Registration Set of IMPU's are going to be implicitly registered as well. For example, as shown in the configuration element 134 of FIG. 4, there is an Implicit Registration Set of IMPU's consisting of the third IMPU 109 and the fourth IMPU 110; then, depending on this second configurable parameter, just the RSI 117 associated with the given IMPU 110, which includes the fourth IMPI 104 and the fifth IMPI 105, is implicitly registered, or also the RSI 116 associated with the given IMPU 109, which includes the first IMPI 101, the second IMPI 102, the fourth IMPI 104 and the fifth IMPI 105, is implicitly registered as well.

On the one hand, as anticipated above, this method may further comprise a step of configuring at the HSS each 'secondary' IMPI of the IMS subscription as 'barred' for registration and, in particular, this step of configuring each 'secondary' IMPI as 'barred' for registration may include a step of barring for own registration the 'secondary' IMPI. This step is preferably made during the step S-100 of configuring the IMS subscription for the subscriber, but it may be carried out at any time during operation. Where this barring is implemented, the determination carried out during the step S-135 of this method, illustrated in FIG. 5, that the given IMPI 103 is a 'primary' IMPI and the given IMPU 110 is the shared IMPU associated with the implicit registration set 117 of 'j' IMPI's further comprises a step not illustrated in any drawing of unbarring for own registration those 'secondary' IMPI's 104-105 included in the implicit registration set 117 of 'j' IMPI's, that is a reset of the registration barring 'OWN' in the configuration elements 124 and 125, preferably carried out by the processing unit 20 of the HSS actuating on the accessible storage 10 or 10a. More precisely, where the accessible storage is arranged for barring an own registration of the 'secondary' IMPI, the processing unit may be arranged for barring and unbarring such registration barring in the configuration 120 of the accessible storage.

On the other hand, and in order to avoid that a kid previously registered by the parents further registers other kid prevented by the parents from registration, the step of configuring each 'secondary' IMPI as 'barred' for registration may also include a step not illustrated in any drawing of barring any 'secondary' IMPI for registration of the implicit registration set of 'j' IMPI's associated with the given IMPU. To this end, the configuration elements 124 and 125 shown in FIG. 3 include a registration barring set to 'RSI'. Moreover, not only a kid previously registered is prevented from registering other kids, but some other family member having a 'primary' IMPI assigned may be wanted to be prevented from registering any implicit registration set of 'j' IMPI's. To this end, this method may further comprise a step not illustrated in any drawing of configuring at the HSS a 'primary' IMPI 106 of the IMS subscription as 'barred' for registration of any implicit registration set of 'j' IMPI's associated with a shared IMPU. To this end, the configuration element 126 shown in FIG. 3 includes a registration barring set to 'RSI'. These steps of barring any 'primary' or 'secondary' IMPI for registration of the implicit registration set of 'j' IMPI's may preferably be made during the above step S-100 of configuring the IMS subscription for the subscriber, but they may be carried out at any time during operation. In principle, this barring for registration of any implicit registration set of 'j' IMPI's, dislike the barring for own registration, should preferably not be reset after the implicit registration, but the processing unit 20 and accessible storage 10-10a of the HSS may also be arranged to this end.

Moreover, in order to support an effective control over call establishment procedures, the method may further comprise a step of configuring at the HSS each non-shared IMPU associated with each 'secondary' IMPI of the IMS subscription as 'barred' for call establishment. To this end, and in accordance with the exemplary IMS subscription illustrated in FIG. 2, the exemplary configuration 130 of FIG. 4 shows the configuration elements 136 and 138 respectively provided for configuring the sixth IMPU 106 and the eighth IMPU 108, which are non-shared IMPU's respectively associated with the 'secondary' IMPI 104 and with the 'secondary' IMPI 106, wherein these configuration elements 136 and 138 indicate the sixth IMPU 106 and the eighth IMPU 108 as barred for call establishment.

This step of configuring each non-shared IMPU associated with each 'secondary' IMPI of the IMS subscription as 'barred' for call establishment may preferably be made during the above step S-100 of configuring the IMS subscription for the subscriber, but it may be carried out at any time during operation.

Where this barring is implemented to control the call establishment procedures, the determination carried out during the step S-175 of the method shown in FIG. 10, that the second given IMPU 114 is a non-shared IMPU associated with a 'secondary' IMPI 105 not previously registered by a 'primary' IMPI 101-103 within an implicit registration set, may be carried out by encountering that the IMPU 114 is 'barred' for call establishment in the configuration element 138. Correspondingly, the determination carried out during the step S-135 of the method illustrated in FIG. 5, that the given IMPI 103 is a 'primary' IMPI and the given IMPU 110 is the shared IMPU associated with the implicit registration set 117 of 'j' IMPI's, further comprises a step not illustrated in any drawing of unbarring for call establishment the non-shared IMPU's 112 and 114 associated with each 'secondary' IMPI 104-105 included in the implicit registration set 117 of 'j' IMPI's. That is, a reset of the barring for call establishment in the configuration elements 136 and 138, preferably carried out by the processing unit 20 of the HSS actuating on the accessible storage 10 or 10a. More precisely, where the accessible storage is arranged for barring the non-shared IMPU's associated with each 'secondary' IMPI, the processing unit may be arranged for barring and unbarring such barring in the configuration 130 of the accessible storage.

Furthermore, where the barring for call establishment of each non-shared IMPU associated with each 'secondary' IMPI, where the barring for own registration of each 'secondary' IMPI, or where both are implemented, the deregistration of 'secondary' IMPI's, which is carried out as a result of the determination made during the step S-195 of the method illustrated in FIG. 11, includes a step of barring for call establishment in the configuration 130 each non-shared IMPU associated with each 'secondary' IMPI, and a step of barring for own registration each 'secondary' IMPI in the configuration 120.

The invention may also be practised by a computer program, loadable into an internal memory of a computer with input and output units as well as with a processing unit. This computer program comprises to this end executable code adapted to carry out the above method steps when running in the computer. In particular, the executable code may be recorded in a carrier readable medium.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method of registering during a single registration process in an IP Multimedia Subsystem (IMS) an implicit registration set of 'j' IMS private identities, the method comprising the steps of:
    configuring at a Home Subscriber Server (HSS) which holds subscriptions for subscribers of the IMS, an IMS subscription for a subscriber with a number 'n' of IMS private identities (IMPI) and a number 'm' of IMS public identities (IMPU), wherein each IMPI is associated with at least one IMPU and each IMPU is associated with at least one IMPI, and wherein one or more IMPU is shared by more than one IMPI; and
    receiving at the HSS from a Serving Call Session Control Function (S-CSCF), which is currently assigned for serving the subscriber, an indication of a registration of the subscriber with a given IMPU and a given IMPI, and an identifier of the S-CSCF; and
wherein the method also comprises:
    for at least one shared IMPU, configuring at the HSS the IMS subscription for the subscriber with an implicit registration set of 'j' IMPI's associated with the shared IMPU;
    configuring at the HSS at least one IMPI as 'primary' IMPI and any other IMPI as 'secondary' IMPI of the IMS subscription for the subscriber;
    determining at the HSS whether the given IMPI is configured as a 'primary' IMPI or as a 'secondary' IMPI; and
    where the given IMPI is a 'primary' IMPI and the given IMPU is the shared IMPU associated with the implicit registration set of 'j' IMPI's which comprises the given IMPI, registering the implicit registration set of 'j' IMPI's and downloading from the HSS towards the S-CSCF the implicit registration set of 'j' IMPI's; or
    where the given IMPI is a 'secondary' IMPI not previously registered by a 'primary' IMPI within an implicit registration set, rejecting the registration of the subscriber with the given IMPU and given IMPI.

2. The method of claim 1, further comprising the steps of:
    receiving a query at the HSS from an Interrogating Call Session Control Function (I-CSCF), which is in charge of receiving an invitation to communicate with a terminating IMS subscriber, about a subscriber identified by a second given IMPU;
    determining at the HSS that the second given IMPU is a non-shared IMPU associated with a 'secondary' IMPI not previously registered by a 'primary' IMPI within an implicit registration set of 'j' IMPI's; and
    rejecting the query about the subscriber with the second given IMPU towards the I-CSCF.

3. The method of claim 1, further comprising a step of configuring at the HSS a 'primary' IMPI of the IMS subscription as 'barred' for registration of the implicit registration set of 'j' IMPI's associated with a shared IMPU.

4. The method of claim 1, further comprising a step of configuring at the HSS each 'secondary' IMPI of the IMS subscription as 'barred' for registration.

5. The method of claim 4, wherein the step of configuring each 'secondary' IMPI as 'barred' for registration includes a step of barring for own registration of the 'secondary' IMPI.

6. The method of claim 4, wherein the step of configuring each 'secondary' IMPI as 'barred' for registration includes a step of barring for registration of the implicit registration set of 'j' IMPI's associated with the given IMPU.

7. The method of claim 1, further comprising a step of configuring at the HSS each non-shared IMPU associated with each 'secondary' IMPI of the IMS subscription as 'barred' for call establishment.

8. The method of claim 5, wherein the step of determining at the HSS that the given IMPI is a 'primary' IMPI and the given IMPU is the shared IMPU associated with the implicit registration set of 'j' IMPI's further comprises a step of unbarring for own registration the 'secondary' IMPI's included in the implicit registration set of 'j' IMPI's.

9. The method of claim 7, wherein the step of determining at the HSS that the given IMPI is a 'primary' IMPI and the given IMPU is the shared IMPU associated with the implicit registration set of 'j' IMPI's further comprises a step of unbarring for call establishment the non-shared IMPU's associated with each 'secondary' IMPI included in the implicit registration set of 'j' IMPI's.

10. The method of claim 1, further comprising the steps of:
    receiving at the HSS an indication of deregistering a subscriber with a given IMPI and a given IMPU from the S-CSCF;
    determining at the HSS that the given IMPI is a 'primary' IMPI and the given IMPU is the shared IMPU associated with the implicit registration set of 'j' IMPI's; and
    deregistering from the HSS all the 'secondary' IMPI's included in the implicit registration set of 'j' IMPI's with any IMPU previously registered.

11. The method of claim 10, further comprising a step of barring for own registration at the HSS the 'secondary' IMPI's included in the implicit registration set of 'j' IMPI's.

12. The method of claim 10, further comprising a step of barring for call establishment the non-shared IMPU's associated with each 'secondary' IMPI included in the implicit registration set of 'j' IMPI's.

13. A Home Subscriber Server (HSS) for holding subscriptions for subscribers of an IP Multimedia Subsystem (IMS), the HSS comprising:
    an accessible storage adapted to configure an IMS subscription for a subscriber with a number 'n' of IMS private identities (IMPI) and a number 'm' of IMS public identities (IMPU), wherein each IMPI is associated with at least one IMPU and each IMPU is associated with at least one IMPI, and wherein one or more IMPU is shared by more than one IMPI;

a receiver adapted to receive from a Serving Call Session Control Function (S-CSCF), which is assigned for serving the subscriber, an indication of a registration of the subscriber with a given IMPI and a given IMPU, and an identifier of the S-CSCF; and a processing unit adapted to determine whether the given IMPU and the given IMPI are associated;

and wherein the accessible storage is adapted to configure the IMS subscription for the subscriber, for at least one shared IMPU, with an implicit registration set of 'j' IMPI's associated with the shared IMPU, and adapted to configure at least one IMPI in the IMS subscription as 'primary' IMPI and any other IMPI as 'secondary' IMPI of the IMS subscription for the subscriber;

the processing unit is adapted to determine whether the given IMPI is a 'primary' IMPI or a 'secondary' IMPI, whether a 'secondary' IMPI has been previously registered within an implicit registration set of 'j' IMPI's, and whether the given IMPU is the shared IMPU associated with the implicit registration set of 'j' IMPI's which comprises the given IMPI; and the HSS also comprises a sender adapted to download towards the S-CSCF the implicit registration set of 'j' IMPI's, where the given IMPI is a 'primary' IMPI and the given IMPU is the shared IMPU associated with the implicit registration set of 'j' IMPI's; or adapted to reject the registration of the subscriber with the given IMPU and given IMPI towards the S-CSCF, where the given IMPI is a 'secondary' IMPI not previously registered by a 'primary' IMPI within an implicit registration set of 'j' IMPI's.

14. The HSS of claim 13, wherein the receiver is adapted to receive a query from an Interrogating Call Session Control Function (I-CSCF), which is in charge of receiving an invitation to communicate with a terminating IMS subscriber, about a subscriber identified by a second given IMPU; and, responsive to the query, the processing unit is adapted to determine that the second given IMPU is a non-shared IMPU associated with a 'secondary' IMPI not previously registered by a 'primary' IMPI within an implicit registration set of 'j' IMPI's; and the sender is adapted to reject the query about the subscriber with the second given IMPU towards the I-CSCF.

15. The HSS of claim 13, wherein the accessible storage includes per 'secondary' IMPI of the IMS subscription a 'barring' indicator configured to bar an own registration of the 'secondary' IMPI.

16. The HSS of claim 13, wherein the accessible storage includes per 'secondary' IMPI of the IMS subscription a 'barring' indicator configured to bar a registration of an implicit registration set of 'j' IMPI's.

17. The HSS of claim 13, wherein the accessible storage includes per each non-shared IMPU associated with each 'secondary' IMPI of the IMS subscription a 'barring' indicator configured to bar the non-shared IMPU for call establishment.

18. The HSS of claim 15, wherein the processing unit is adapted to unbar and bar in the accessible storage the own registration of the 'secondary' IMPI's included in the implicit registration set of 'j' IMPI's.

19. The HSS of claim 17, wherein the processing unit is adapted to unbar and bar in the accessible storage the call establishment for the non-shared IMPU's associated with each 'secondary' IMPI included in the implicit registration set of 'j' IMPI's.

20. The HSS of claim 13, wherein the receiver is adapted to receive from the S-CSCF an indication of deregistering a subscriber with a given IMPI and a given IMPU; and, responsive to the deregistration, the processing unit is adapted to determine that the given IMPI is a 'primary' IMPI and the given IMPU is the shared IMPU associated with the implicit registration set of 'j' IMPI's; and, in cooperation with the sender, the processing unit is adapted to deregister towards the S-CSCF all the 'secondary' IMPI's included in the implicit registration set of 'j' IMPI's with any IMPU previously registered.

21. A Serving Call Session Control Function (S-CSCF) server for serving subscribers of an IP Multimedia Subsystem (IMS), the S-CSCF comprising:

a sender adapted to submit towards a Home Subscriber Server (HSS), which holds subscriptions for subscribers of the IMS, an indication of a registration of an IMS subscriber with a given IMS public identity (IMPU) and a given IMS private identity (IMPI), and an identifier of the S-CSCF;

and wherein also comprises:

a receiver adapted to receive from the HSS an implicit registration set including a number 'j' of IMPI's associated with the given IMPU;

a processing unit adapted to determine that the given IMPI is a 'primary' IMPI of the IMS subscription; and an accessible storage adapted to store the 'primary' IMPI along with the implicit registration set of 'j' IMPI's, and the given IMPU explicitly registered.

22. The S-CSCF server of claim 21, wherein the receiver is adapted to receive from the HSS a set with a number 'k' of contact addresses to reach the IMPI's currently registered; and the accessible storage is arranged for storing the set of 'k' contact addresses in association with the IMPI's currently registered, and with the given IMPU explicitly registered.

23. The S-CSCF server of claim 21, wherein the receiver is adapted to receive from the HSS an indication per IMPI in the implicit registration set of 'j' IMPI's indicating whether such IMPI is a 'primary' or 'secondary' IMPI of the IMS subscription.

24. A non-transitory computer readable medium comprising executable code adapted to carry out the method steps according to claim 1 when running in the computer.

* * * * *